3,506,607
ABLATIVE COMPOSITIONS
William J. Bobear, Latham, N.Y., assignor to General Electric Company, a corporation of New York
No Drawing. Filed July 9, 1965, Ser. No. 470,892
Int. Cl. C08g 51/04; C08k 1/02
U.S. Cl. 260—37                3 Claims

ABSTRACT OF THE DISCLOSURE

Ablative compositions are provided comprising an organopolysiloxane polymer, a silica filler, and a finely divided metal or metalloid, such as silicon. The ablative compositions can provide for protective coatings on the surface of rockets and re-entry vehicles.

---

This invention relates to an ablative composition and a method for its use, and more particularly to an organopolysiloxane rubber containing, in addition to a silica filler, a finely divided elemental metal or metalloid.

Ablation is a process where, through combined thermal, chemical, and mechanical degradation, materials dissipate energy with an attendant loss of surface material. The earliest ablative materials known were meteorites which demonstrated, in principle, the utility of aerodynamic ablation for thermally protecting objects traveling through the atmosphere at speeds greatly in excess of the speed of sound. A great deal of early research was directed to determining the composition of these meteorites and the mechanism by which they were thermally protected while traveling at high rates of speed through the atmosphere. However, it was apparent that because of the high weight and questionable reliability of these materials, they were inadequate for thermal protection of man-made objects.

With the advent of the space age, a great deal of research was directed toward formulating ablation compounds which would be useful in rocket propulsion and re-entry systems. A wide variety of materials were investigated and, in general, the plastics and related compositions, including silcone rubbers, were found to possess a unique combination of properties and characteristics which made them especially suitable as ablative compounds. A large number of additives were incorporated into theese plastics and related compositions to attain specific properties not available with the plastic, alone. For example, fiber reinforcements, both organic and inorganic, and other forms of organic resinous materials were found to provide especially advantageous properties, the organic materials pyrolyzing into various gaseous components to lessen convective heat transfer to the ablating surface.

In addition, the use of carbon, as in the form of carbon black, has heretofore been suggested for use in combination with silica fillers in ablative materials. The carbon and silica are believed to react endothermically to improve the ablative properties of the carbon-based resinous ablative materials in which they are incorporated. However, the use of carbon, alone, is undesirable because:

(1) A dirty, sticky composition results, and
(2) Carbon can interfere with the cure system of silicone rubbers.

As a result of the many compositions tested, certain general rules were formulated as to what would constitute a good ablative material. Among these characteristics were a low density and a low thermal conductivity. It has, in fact, been stated that the thermal conductivity of a material has a definite bearing upon the thermal insulative performance of an ablative material. The lower the value of the conductivity, the lower the temperature that can be maintained in the underlying substrate.

In accordance with the present invention, it has unexpectedly been discovered that the inclusion of certain elemental metals and metalloids in a silicone rubber composition containing silica results in improved ablation properties. In view of the density and the high thermal conductivity of the metals, one would not expect their inclusion in an ablative material to improve the ablative properties of that material. However, it has been found that the inclusion of at least one of these elemental metals or metalloids in a silcone rubber composition containing silica actually lowers the backside temperature rise and the ablation velocity (rate of surface recession) when the material is exposed to environmental conditions that cause ablation, such as a high temperature plasma.

Among the well-known properties of silicone rubber are its superior resistance to heat, stable electrical properties, unequaled reistance to long-term aging and weathering, resistance to fungus growth, high degree of water repellency, and good radiation resistance. Each of these properties makes silicone rubber especially valuable, but in combination with its ability to withstand temperatures of up to thousands of degrees Fahrenheit for short periods of time, it becomes an invaluable ablative material. When the ablative additives, in accordance with the present invention, are included in these silicone rubbers an even more valuable material is formed. In addition to rockets and re-entry vehicles, these properties are especially valuable in protecting wire and cable, pipe, and test equipment in silos and mobile launch sites from the heat of rocket blasts. As silicone rubber is a true elastomer, it is unaffected by sharp, right-angle bends which are frequently required during installation of an ablative material. It does not cold flow under pressure. Thus, while some other materials may surpass a few of the silicone rubber properties mentioned above, no other material combines each of these properties so effectively. Thus, silicone rubber has been selected in the past as an ablative material.

The organopolysiloxanes utilized in the formulations of the present invention are gums of the formula:

(1) 
$$R_aSiO_{\frac{4-a}{2}}$$

where R is selected from the class consisting of monovalent hydrocarbon radicals, monovalent halogenated hydrocarbon radicals, and cyanoalkyl radicals, and $a$ is from 1.98 to 2.01. These materials are convertible to the cured, solid, elastic state through the use of well-known means, such as heating in the presence of a cross-linking agent, for example, benzoyl peroxide or bis(2,4-dichlorobenzoyl) peroxide, utilization of high energy radiation, etc. Most generally, these convertible organopolysiloxane gums have viscosities in the range of from 5,000,000 to 100,000,000 centistokes at 25° C. Methods for manufacturing these convertible organopolysiloxane gums are well known in the art, some of the methods being shown in Sprung Patent 2,484,595 and Warrick Patent 2,460,795. These materials can advantageously be obtained by the hydrolysis of a diorganodihydrolyzable silane, for example, dimethyldichlorosilane, with or without the presence of other diorganodihydrolyzable silanes, monoorganotrihydrolyzable silanes, and triorganomonohydrolyzable silanes, and thereafter effecting condensation of the hydrolysis product using a condensation catalyst, as, for exmaple, an alkaline condensing agent, such as, potassium hydroxide, sodium hydroxide, etc., or an acidic condensing agent, such as ferric chloride, etc.

Alternately, cyclic organopolysiloxanes of dimethylsiloxane, with or without cyclic organopolysiloxanes containing other substituents, can be intercondensed with, for example, alkaline condensing agents to give the desired convertible organopolysiloxane gum.

Among the hydrocarbon radicals which R represents are alkyl radicals, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, biphenyl, naphthyl, benzoylphenyl, paraphenoxyphenyl, tolyl, xylyl, etc.; aralkyl radicals, such as, benzyl, phenethyl, etc.; and alkenyl radicals, such as, vinyl, allyl, cyclopentenyl, etc. Halogenated monovalent hydrocarbon radicals represented by R include, for example, chloromethyl, dibromophenyl, trifluoromethylpropyl, trifluoromethylphenyl, etc. In addition, R represents cyano-substituted radicals, such as, cyanomethyl, α-cyanoethyl, β-cyanoethyl, β-cyanopropyl, γ-cyanopropyl, cyanophenyl, etc. The preferred convertible organopolysiloxanes for use in the present invention are those where R is from 0 to 35% phenyl radicals, from 0 to 2% vinyl radicals, and the remainder substantially all methyl radicals.

The silicone rubber compositions defined according to the present invention also include a filler. Various fillers can be employed, as, for example, finely divided silicas, such as, silica aerogel, fumed silica, diatomaceous earth, titanium dioxide, lithopone, and fillers treated with organosilicon materials, such as, trimethylchlorosilane, etc. The amount of filler employed can be widely varied and can comprise, for example, from about 25 to 300 parts, by weight, per 100 parts of convertible organopolysiloxane gum. Preferably, the amount of filler is in the range of from 25 to 100 parts, by weight, based on 100 parts of the convertible organopolysiloxane gum.

In order to accelerate the cure of the previously described convertible organopolysiloxane gums, it is preferable to add a curing agent. Among the cure accelerating agents can be mentioned, for example, benzoyl peroxide, tertiary butyl perbenzoate, bis-(2,4-dichlorobenzoyl) peroxide, tertiary butyl peroxy isopropyl carbonate, tertiary butyl peroxy 2-ethyl hexanoate, etc. These cure accelerating agents can be present in varying amounts, ranging from about 0.01% to as high as 6 to 10%, by weight, or more, based on the weight of the convertible organopolysiloxane. Instead of employing such chemical curing agents, curing of the convertible organopolysiloxane can be accelerated with high energy electrons, among other means.

The elemental metals and metalloids which can be employed in combination with the silica filler, in accordance with the present invention, are those metals and metalloids selected from Groups II–A, III–B, IV–B, V–B, VI–B, VII–B, VIII, I–B, II–B, III–A, IV–A, and V–A of the Periodic Table of elements. The terms metal and metalloid include all the elements of each of the previously described groups except for Groups IV–A and V–A. In Group IV–A, the term metal includes germanium, tin, and lead while the metalloid, silicon, of Group IV–A is also a utilizable element. The metals and metalloids included by the description of Group V–A of the Periodic Table of the elements include arsenic, antimony, and bismuth. It should, of course, be understood that more than one of these elements can be used in a particular formulation to improve the ablative properties of the silicone rubber. These elemental metals and metalloids should be incorporated in the silicone rubber composition in an amount of from 0.01 to 100 parts, by weight, per 100 parts of the organopolysiloxane gum. Preferably, the amount of elemental metal or metalloid is in the range of from 2 to 30 parts, by weight, per 100 parts of the convertible organopolysiloxane gum. It is essential, in order to obtain the best performance with the minimum amount of material, that these materials be present in a finely divided state. The particle size of the elemental metals and metalloids used in the composition of the present invention should be 177 microns or less, that is, small enough to pass through a standard 80 mesh screen. Preferably, the particle size of these materials is less than 74 microns, or small enough to pass through a 200 mesh screen.

While I do not wish to be bound by theory, it is my belief that the improvement in ablation properties resulting from incorporation of the elemental metals and metalloids described is due to a chemical reaction between these materials and the silica filler which is also present. For example, at temperatures of about 1,000° C., the reaction:

(2) 

requires approximately 158,000 calories per mole. Similarly, the reaction:

(3) 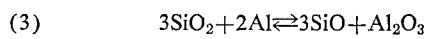

requires about 158,000 calories per mole. The reaction of silica with magnesium to produce silicon monoxide and magnesium oxide consumes about 43,000 calories, as a further comparison.

Many other materials, commonly used in ablation compounds, can also be used in conjunction with the elemental metals and metalloids to provide particular properties. For example, fibrous silica fillers can be included to strengthen the char layer which is formed on the surface of the ablating material. This char layer re-radiates the flux and diminishes the heat incident on the surface of the ablating compound. Additionally, other inorganic fibers, such as asbestos, and inorganic materials such as clays and glass microballoons can be included in these ablation compounds. Carbon black, while preferably not used alone, can be employed in conjunction with the metals and metalloids of the present invention. Organic materials, which are well known in the art as additives for ablation compounds can also be included. Among these are polyethylene, nylon, phenolic microballoons, and other thermoplastic and thermosetting organic resins. These further additives should be employed in amounts of from about 1 to 100 parts, by weight, per 100 parts of convertible organopolysiloxane gum. Preferably, the additional inclusions are in the range of 10 to 50 parts per 100 parts of convertible organopolysiloxane gum.

In order to enable those skilled in the art to better understand the practice of the present invention, the following examples are given. These examples should be considered illustrative only and not as limiting in any way the full scope of the invention as covered in the appended claims.

In order to determine the ablative properties of the silicone rubber compositions of the present invention, cured test slabs with dimensions of 4″ x 4″ x 0.250″ were prepared. Using a room temperature vulcanizing silicone sealant, a thermocouple was bonded to the center of the rubber test slab. A cork slab having dimensions of 4″ x 4″ x 0.500″ was then bonded to the silicone rubber slab, sandwiching the thermocouple. An aluminum panel having dimensions of 4″ x 4″ x 0.100″ was then bonded to the exposed face of the cork slab using a room temperature vulcanizing silicone sealant, and the entire assembly was allowed to dry, under pressure. The thus prepared sample was then placed in a jig and an oxyacetylene torch, with the tip placed 0.5″ from the edge of the slab toward the center of the slab, was aimed so that the extended centerline of the tip of the torch would be 1″ from the center of the silicone rubber slab, with a flame angle of incidence with the horizontal of 20°. For a period of 60 seconds a flame was generated employing an oxygen flow rate of 64 cubic feet per hr. and an acetylene flow rate of 55 cubic feet per hour, equivalent to a total mass flow rate of 0.0025 pound per second. The temperature, as indicated by the thermocouple, was recorded during the 60 second exposure and the final temperature, after 60 seconds, was compared with the temperature prior to subjecting the silicone rubber slab to the oxyacetylene flame. The sample was then removed from the test jig and cut in half through the point of maximum erosion (generally the center of the slab). The char which formed was then scraped from this point of erosion and the depth of erosion measured, the depth being used to calculate the ablation velocity in mils per second. Converting the ablation velocity to units of feet per second and multiplying this figure by the density of the silicone rubber, as determined before forming the sample, yields the mass loss rate of the material in the test in lb./ft.$^2$-sec.

A specification for rubber to be used as base-heating insulation on rockets calls for a backside rise of no more than 100° F. and an ablation velocity of no more than 1.5 mils per second in the above described oxyacetylene torch test. It is also desirable for the material to show a mass loss rate of 0.009 lb./ft.$^2$-sec. The following data will show that when a silicone rubber composition is formulated according to the present invention, the maximum 100° F. backside rise can be maintained while limiting the ablation velocity to 1.0 mil per second in the case of convertible organopolysiloxane gums free of phenyl substituents. When the convertible organopolysiloxane gum contains significant amounts of silicon-bonded phenyl substituents, the ablation velocity specification of 1.5 mils per second is met, while the backside temperature rise is limited to 85° F. In either case the mass loss rate is within the desirable range.

The first series of examples will illustrate the effectiveness of the compositions of the present invention using organopolysiloxane gums which are free of silicon-bonded phenyl groups.

EXAMPLES 1–10

In this series of examples the effect of Group III-A metals and metalloids on the ablative characteristics of a silicone rubber are shown. In each case the organopolysiloxane gum had a viscosity of approximately 77,000,000 centipoises and was essentially a polydimethylsiloxane with approximately 0.2% of the methyl groups replaced with silicon-bonded vinyl groups. In each of the examples the formulation contained 100 parts of the organopolysiloxane gum, 35 parts of silica filler, and ablative additive as indicated in the table which also shows the size of the ablative additive, the backside temperature rise, ablation velocity, and mass loss rate in the oxyacetylene torch test, as previously described. Each of the formulations was cured with 0.3 to 2% tertiary butyl peroxy isopropyl carbonate.

TABLE I

| Example | Ablative Additive Type | Amount (Parts) | Mesh Size | Backside Temperature Rise (° F.) | Ablation Velocity (mil/sec.) | Mass Loss Rate (lb./ft.$^2$-sec.) |
|---|---|---|---|---|---|---|
| 1 | Al | 6 | −200 | 95 | 0.90 | 0.0053 |
| 2 | Al | 11.7 | −200 | 82 | 0.95 | 0.0057 |
| 3 | Al | 12.0 | −200 | 80 | 0.86 | 0.0052 |
| 4 | Al | 18.0 | −200 | 85 | 0.91 | 0.0056 |
| 5 | {Al, C} | {6.0, 2.0} | −200 | 71 | 0.83 | 0.0049 |
| 6 | {Al, Cu} | {2.0, 23.0} | {−200, −400} | 79 | 0.74 | 0.0050 |
| 7 | B | 1.0 | −400 | 75 | 0.75 | 0.0043 |
| 8 | B | 3.24 | −400 | 67 | 0.70 | 0.0041 |
| 9 | B | 6.0 | −400 | 67 | 0.65 | 0.0038 |
| 10 | B | 12.0 | −400 | 68 | 0.45 | 0.0027 |

EXAMPLES 11–16

In this series of examples, the utility of metals of Group VIII is shown. The formulations, except for the metal ablative additives, are the same as in Examples 1–10. The data on additives and test results are shown for the Group VIII metals in Table II in the same manner as the data presented in Table I.

TABLE II

| Example | Ablative Additives Type | Amount (Parts) | Mesh Size | Backside Temperature Rise (° F.) | Ablation Velocity (mil/sec.) | Mass Loss Rate (lb./ft.$^2$-sec.) |
|---|---|---|---|---|---|---|
| 11 | Fe | 15.0 | −200 | 81 | 0.75 | 0.0047 |
| 12 | Fe | 15.0 | −200 | 75 | 0.78 | 0.0049 |
| 13 | Fe | 31.4 | −200 | 89 | 0.64 | 0.0044 |
| 14 | Ni | 18.0 | −400 | 74 | 0.80 | 0.0051 |
| 15 | Ni | 35.6 | −400 | 80 | 0.79 | 0.0055 |
| 16 | Ni | 162.0 | −400 | 140 | 0.99 | 0.0011 |

From the results in the above table, the effect of too great a concentration of the metals described in the present invention is shown. While in Examples 14 and 15 it can be seen that nickel is effective in lowering the backside rise and ablation velocity, Example 16 demonstrates the high backside temperature rise when a high concentration of nickel powder is included in the silicone rubber formulation. Results similar to those in Table II are obtained when the metals of Group VII-B are employed in silicone rubber formulations for ablation use.

EXAMPLES 17–28

In this series of examples the effectiveness of the metals and metalloids of Group IV-A is shown. The formulations are the same as those as in Examples 1–10, with the exception of the ablative additives as indicated in Table III. The data on formulations and test results are presented in Table III in the same manner as in Tables I and II.

TABLE III

| Example | Ablative Additives Type | Amount (Parts) | Mesh Size | Backside Temperature Rise (° F.) | Ablation Velocity (mil/sec.) | Mass Loss Rate (lb./ft.²-sec.) |
| --- | --- | --- | --- | --- | --- | --- |
| 17 | Si | 1.0 | −250 | 89 | 0.89 | 0.0052 |
| 18 | Si | 2.0 | −250 | 82 | 0.75 | 0.0043 |
| 19 | Si | 4.0 | −250 | 75 | 0.89 | 0.0052 |
| 20 | Si | 4.0 | −250 | 75 | 0.84 | 0.0049 |
|  | C | 2.0 | −400 |  |  |  |
| 21 | Si | 8.0 | −250 | 80 | 0.81 | 0.0047 |
| 22 | Si | 9.2 | −250 | 74 | 0.76 | 0.0045 |
| 23 | Si | 17.6 | −250 | 79 | 0.85 | 0.0053 |
| 24 | Si | 18.4 | −250 | 81 | 0.68 | 0.0042 |
| 25 | Si | 22.5 | −250 | 95 | 0.79 | 0.0052 |
|  | Clay | 12.3 | −400 |  |  |  |
| 26 | Si | 27.6 | −400 | 86 | 0.63 | 0.0039 |
| 27 | Sn | 15.0 | −250 | 75 | 0.89 | 0.0056 |
| 28 | Sn | 29.2 | −250 | 84 | 0.95 | 0.0071 |

Results similar to those shown in Table III are obtained using the metals of Group IV-B.

EXAMPLES 29-32

The effectiveness of metals of Group VI-B are shown in this series of examples. The formulations were the same as in Examples 1-10, except for the ablative additives, as shown in Table IV. The ablative additive and its size, and the test results are shown in Table IV in the same manner as in Tables I-III.

TABLE IV

| Example | Ablative Additives Type | Amount (Parts) | Mesh Size | Backside Temperature Rise (° F.) | Ablation Velocity (mil/sec.) | Mass Loss Rate (lb./ft.²-sec.) |
| --- | --- | --- | --- | --- | --- | --- |
| 29 | W | 10.0 | −325 | 79 | 0.74 | 0.0046 |
| 30 | W | 20.0 | −325 | 70 | 0.70 | 0.0048 |
| 31 | W | 40.0 | −325 | 76 | 0.79 | 0.0063 |
| 32 | W | 77.0 | −325 | 75 | 0.74 | 0.0063 |

Similar results to those shown above are obtained using the metals of Group V-B.

EXAMPLE 33

An indication of the effectiveness of using the metals of Group I-B was shown in Example 6 where 23 parts of copper was combined with 2 parts of aluminum in the silicone rubber tested with an oxyacetylene torch. A further indication is given in this example where a composition was formulated containing 100 parts of the previously described organopolysiloxane gum, 27 parts of silica, and 35.8 parts of copper having a particle size of less than 400 mesh. When tested with the oxyacetylene torch, this material showed a backside temperature rise of 88° F., an ablation velocity of 0.78 mil per second, and a mass loss rate of 0.0055 lb./ft.²-sec.

EXAMPLE 34

The utility of the metals of Group II-A is shown in this example where magnesium powder was employed. The formulation contained 100 parts of the previously described organopolysiloxane gum, 35 parts of silica, 1.4 parts of titania, and 8 parts of an 80 mesh magnesium powder. When tested in the oxyacetylene torch, the material showed a backside temperature rise of 100° F., an ablation velocity of 0.85 mil per second, and a mass loss rate of 0.005 lb./ft.²-sec. The materials of Group III-B perform similarly.

EXAMPLES 35-47

In the following examples the effectiveness of the metal and metalloid ablative additives, described in Examples 1-36 for non-phenyl substituted organopolysiloxane gums, is shown for phenyl-containing organopolysiloxanes. The formulations in each case were the same as those for the non-phenyl containing materials, that is, 100 parts of organopolysiloxane gum, 35 parts of silica filler, and ablative additive as indicated in the table. Further, each of the materials was cured with from 0.3 to 2%, based on the organopolysiloxane gum, of t-butyl peroxy isopropyl carbonate. Table V shows, in addition to the formulation and test results shown in Tables I-IV, the phenyl content of the organopolysiloxane gum in percent of silicon-bonded phenyl group.

TABLE V

| Example | Silicon-Bonded Phenyl Groups Percent | Ablative Additives Type | Amount (Parts) | Mesh Size | Backside Temperature Rise (° F.) | Ablation Velocity (mils/sec.) | Mass Loss Rate (lb./ft.²-sec.) |
| --- | --- | --- | --- | --- | --- | --- | --- |
| 35 | 5.3 | B | 12.0 | −400 | 68 | 0.88 | 0.0054 |
| 36 | 5.3 | Fe | 15.0 | −200 | 75 | 1.00 | 0.0054 |
| 37 | 5.3 | Ni | 18.0 | −200 | 74 | 1.02 | 0.0067 |
| 38 | 5.3 | Si | 2.0 | −250 | 70 | 0.87 | 0.0052 |
|  |  | C | 4.0 | −400 |  |  |  |
| 39 | 12.0 | Si | 4.0 | −250 | 69 | 0.88 | 0.0055 |
| 40 | 15.0 | Si | 4.0 | −250 | 79 | 1.22 | 0.0076 |
| 41 | 10.0 | Si | 4.0 | −250 | 74 | 1.15 | 0.0070 |
| 42 | 15.0 | Si | 4.0 | −250 | 75 | 0.79 | 0.0045 |
| 43 | 20.0 | Si | 4.0 | −250 | 79.5 | 0.71 | 0.0045 |
| 44 | 25.0 | Si | 4.0 | −250 | 78 | 0.90 | 0.0058 |
| 45 | 5.3 | Si | 18.4 | −250 | 79 | 1.05 | 0.0065 |
| 46 | 5.3 | Sn | 18.0 | −250 | 79 | 1.23 | 0.0081 |
| 47 | 5.3 | Cu | 18.0 | −400 | 85 | 1.31 | 0.0086 |

As can be seen from the above table, each of the materials formulated according to the present invention has an ablation velocity below 1.5 mils per second and a backside temperature rise of no more than 85° F. This compares with the previously mentioned specification of 1.5 mils per second ablation velocity and a backside temperature rise of no more than 100° F. Additionally, most of Examples 37-49 easily fall below an ablation velocity of 1.05 mils per second in addition to having a backside temperature rise of less than 85° F.

The previous examples demonstrate the utility of using metals and metalloids of Groups II-A, III-B, IV-B, V-B, VI-B, VII-B, VIII, I-B, II-B, III-A, IV-A, and V-A in ablative formulations. The preferred materials are those in Groups III-A, IV-A, and VIII, from a standpoint of either cost or performance and, more particularly, aluminum, boron, silicon, and iron. Another preferred group of materials includes nickel, tin, tungsten, copper and magnesium, in addition to aluminum, boron, silicon, and iron. Each of the materials formulated according to the present invention easily meets the specification for base-heating insulation. Further, depending upon the organopolysiloxane gum used, each of these formulations easily surpasses this specification either in backside temperature rise or in ablation velocity.

Again, as previously mentioned, the ablative compounds formulated according to the present invention can contain, in addition to the silica and metal or metalloid additive, any of the fillers generally employed in ablative compounds. For example, metal oxides, carbon black, organic resins, either as fibers or particles, and inorganic fibers can be added to the formulations to achieve particular results.

In order to utilize the compositions described a mold is made, the shape of the mold being adapted to produce a contoured piece of material suitable for bonding to the surface of an object to be thermally protected, and the mold having a cavity thickness of from a few mils to several inches. A silicone rubber composition, as previously described, is placed in this mold with a catalyst and the composition is cured in a manner previously described. The cured composition is removed from the mold and is bonded to the surface of the object to be protected, for example a metal such as a titanium-base alloy. It should be understood, of course, that the metal and metalloid additives can be incorporated in materials such as room temperature vulcanizing silicone materials which would then be applied to the surface to be protected, either with or without priming, and allowed to cure in contact with that surface.

What I claim as new and desire to secure by Letters Patent of the United States is:

1. An ablative composition comprising by weight
   (1) 100 parts of a methylpolysiloxane gum having from 1.98 to 2.01 methyl radicals per silicon atom,
   (2) 25 to 300 parts of a silica filler,
   (3) 0.01 to 100 parts of at least one finely divided additive selected from the class consisting of aluminum, boron, silicon, and iron.

2. The ablative composition of claim 1 wherein the silica filler is present in an amount of from 25 to 100 parts, by weight.

3. The ablative composition of claim 1 wherein the additive selected from the class consisting of metals and metalloids is present in an amount of from 2 to 30 parts, by weight.

References Cited

UNITED STATES PATENTS

| | | |
|---|---|---|
| 3,109,013 | 10/1963 | Haluska. |
| 3,114,721 | 12/1963 | Bobear. |
| 3,274,145 | 9/1966 | Dupree. |
| 3,317,455 | 5/1967 | Blome et al. |
| 3,344,106 | 9/1967 | Waterford. |

MORRIS LIEBMAN, Primary Examiner

L. T. JACOBS, Assistant Examiner